United States Patent Office 3,126,372
Patented Mar. 24, 1964

3,126,372
9-D-PSICOFURANOSYLPURINE DERIVATIVES
Brian Bannister, Kalamazoo Township, Kalamazoo County, Mich., assignor to The Upjohn Company, Kalamazoo, Mich., a corporation of Delaware
No Drawing. Filed Jan. 26, 1959, Ser. No. 788,747
1 Claim. (Cl. 260—211.5)

This invention relates to novel derivatives of nucleosides and is more particularly concerned with trityl derivatives of purine ketosides.

The novel compounds of the invention can be represented, for the most part, by the following general formula:

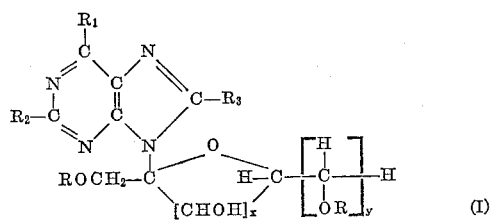

(I)

wherein $x$ is an integer from 2 to 3, and $y$ is an integer from 0 to 2, provided that the sum of $x+y$ is not greater than 4, and wherein R represents a trityl (triphenylmethyl) radical and $R_1$, $R_2$ and $R_3$ are selected from the class consisting of hydrogen, halogen, tritylamino, tritylmercapto, hydroxy, mercapto, lower-alkoxy, lower-aralkoxy, lower-aryloxy, lower-alkyl, lower-aralkyl, lower-aryl, lower-alkylmercapto, lower-aralkylmercapto, lower-arylmercapto, and

wherein $R_4$ and $R_5$ are selected from the class consisting of hydrogen, lower-alkyl, lower-aralkyl, and lower-aryl.

The term "lower-alkyl," as used throughout the specification and claims, is intended to mean an alkyl radical containing from 1 to 8 carbon atoms, inclusive, such as methyl, ethyl, propyl, butyl, amyl, hexyl, heptyl, octyl, and isomeric forms thereof; the term "lower-aralkyl" is intended to mean an aralkyl radical containing from 7 to 13 carbon atoms, inclusive, such as benzyl, phenylethyl, benzhydryl, and the like; the term "lower-aryl" is intended to mean an aryl radical containing from 6 to 12 carbon atoms, inclusive, such as phenyl, tolyl, xylyl, naphthyl, biphenylyl and the like; the term "lower-alkylmercapto" is intended to mean an alkylmercapto radical containing from 1 to 8 carbon atoms, inclusive, such as methylmercapto, ethylmercapto, propylmercapto, butylmercapto, amylmercapto, hexylmercapto, heptylmercapto, octylmercapto, and isomeric forms thereof; the term "aralkylmercapto" is intended to mean a lower-aralkylmercapto radical containing from 7 to 13 carbon atoms, inclusive, such as benzylmercapto, phenylethylmercapto, benzhydrylmercapto and the like; the term "lower-arylmercapto" is intended to mean an arylmercapto radical containing from 6 to 12 carbon atoms, inclusive, such as phenylmercapto, tolylmercapto, xylylmercapto, naphthylmercapto, biphenylylmercapto and the like; the term "lower-alkoxy" is intended to mean an alkoxy radical containing from 1 to 8 carbon atoms, inclusive, such as methoxy, ethoxy, propoxy, butoxy, amyloxy, hexyloxy, heptyloxy, octyloxy, and isomeric forms thereof; the term "lower-aralkoxy" is intended to mean an aralkoxy radical containing from 7 to 13 carbon atoms, inclusive, such as benzyloxy, phenylethoxy, benzhydryloxy and the like; and the term "lower-aryloxy" is intended to mean an aryloxy radical containing from 6 to 12 carbon atoms, such as phenoxy, tolyloxy, xylyloxy, naphthoxy, biphenylyloxy, and the like.

The novel compounds of the invention are valuable intermediates in the preparation, as will be described hereinafter, of mono-acyl and polyacyl derivatives of the compounds having the following general formula:

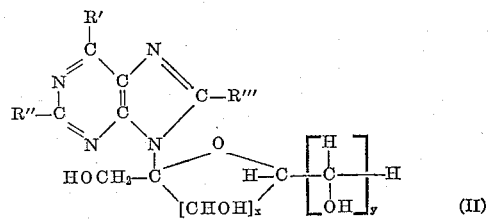

(II)

wherein $x$ and $y$ are as hereinbefore defined and R', R", and R''' are selected from the class consisting of hydrogen, halogen, mercapto, hydroxy, lower-alkoxy, lower-aralkoxy, lower-aryloxy, lower-alkyl, lower-aralkyl, lower-aryl, lower-alkylmercapto, lower-aralkylmercapto, lower-arylmercapto, and

wherein $R_4$ and $R_5$ are as hereinbefore defined. Said monoacyl and polyacyl derivatives of the compounds having the Formula II have valuable therapeutic activity as antibacterial agents.

Thus, the compounds of the invention having the Formula I above when allowed to react with an equimolar amount of the acid halide or acid anhydride of a hydrocarbon carboxylic acid, as hereinafter defined, in the presence of a tertiary amine such as pyridine, triethylamine, and the like, give a mixture of the corresponding monoacylates. Said monoacylates are produced by acylation of the secondary alcohol groups present in the sugar residue of the compounds having the Formula I above. In the case where $x$ has the value 2 (i.e., the sugar residue is in the furanose ring form), the acylation will give a mixture of the two possible monoacylates and in the case where $x$ has the value 3 (i.e., the sugar residue is in the pyranose ring form), the acylation will give a mixture of the three possible monoacylates. These mixtures of monoacylates can be separated into their individual components by conventional means, for example, by partition chromatography or by countercurrent distribution in a suitable solvent system.

Similarly, when the amount of acid halide or anhydride employed in the above acylation is at least two molar proportions per mole of the compound having the Formula I, there will be produced the corresponding diacylate in the case where $x$ has the value 2. Where $x$ has the value 3, there will be obtained a mixture of the three possible diacylates, and, if an excess of acylating agent is used, the corresponding triacylate. Said mixture of diacylates can be separated by conventional means; for example, by partition chromatography or by countercurrent distribution in a suitable solvent system. The monoacylates, diacylates and, where $x$ has the value 3, the triacylates of the compounds having the Formula I above, which are obtained by the above-described acylation can be treated to remove the trityl groups whereby there are obtained the corresponding monoacylates, diacylates, and triacylates of the compounds having the Formula II. The removal of the trityl groups can be accomplished in a convenient manner by subjecting the acyl derivatives of the compounds having the Formula I above to catalytic hydrogenolysis in the presence of a catalyst such as palladium-on-charcoal.

The monoacylates, diacylates and triacylates (in the case where $x$ has the value 3) of the compounds having the Formula II above, so obtained, can then be acylated further to yield the higher polyacylates of the compounds having the Formula II. The acylating agents used in the latter acylation advantageously are different from those used in the acylation of the compounds having the Formula I above so that there are obtained polyacylates of compounds having the Formula II in which the acyl groups are not all identical.

The acid halides or anhydrides which can be employed as acylating agents in the above reactions suitably are those derived from hydrocarbon carboxylic acids containing from 1 to 12 carbon atoms, inclusive, and halo-, nitro-, hydroxy-, amino-, cyano-, thiocyano- and lower-alkoxy-substituted hydrocarbon carboxylic acids containing from 1 to 12 carbon atoms, inclusive. Suitable such acids include acetic, propionic, butyric, isobutyric, tert-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, methylcyclopentenecarboxylic, cyclohexanecarboxylic, dimethylcyclohexanecarboxylic, cyclopentylacetic, cyclohexylbutyric, methylcyclohexylacetic, benzoic, toluic, naphthoic, ethylbenzoic, phenylacetic, naphthaleneacetic, phenylvaleric, cinnamic, phenylpropiolic, chloroacetic, bromobutyric, iodovaleric, chlorocyclohexylcarboxylic, chlorobenzoic, anisic, salicylic, nitrobenzoic, cyanoacetic, thiocyanoacetic, and lactic acids, glycine, and the like. It is to be noted that where the acylating agent, employed in the acylation of the tritrityl compound of the invention, is derived from an acid which contains a group or groups capable of being reduced by catalytic hydrogenation, such groups will be so reduced during the hydrogenolysis of the trityl acylate to remove the trityl groups. Acids, the acyl radicals of which will be reduced under such conditions, include acrylic, crotonic, hexynoic, heptynoic, octynoic, cyclopentenecarboxylic, methylcyclopentenecarboxylic, cinnamic, phenylpropiolic, nitrobenzoic acids, and the like.

The novel compounds of the invention, with the exception of those in which one or more of the groups $R_1$, $R_2$ and $R_3$ represent a free amino or free mercapto group, can be prepared in a convenient manner by the reaction of a trityl halide, for example, trityl chloride or trityl bromide, with a compound having the Formula II above in the presence of a tertiary amine. Suitable tertiary amines include pyridine, quinoline, isoquinoline, trialkylamines such as trimethylamine, triethylamine, tri-isopropylamine, and the like, N,N-dialkylanilines such as dimethylaniline, diethylaniline, and the like, and N-alkylpiperidines such as N-ethylpiperidine, N-methylpiperidine, and the like. The preferred amine is pyridine. The reaction is carried out advantageously by heating the mixture of reactants at a temperature of the order of 100° C. for several hours. The reaction product can be decomposed in a convenient manner by addition to ice-water and the desired compound isolated therefrom by conventional procedures; for example, by extraction in a suitable solvent such as chloroform. The compound so obtained can be purified, if necessary, by procedures known in the art; for example, by chromatography.

In carrying out the above reaction it is desirable to employ an amount of trityl halide in excess of the stoichiometric proportion. Thus, where a compound having the Formula II in which $y$ has the value 0 is employed as starting material (i.e., there is only one primary alcohol group in the sugar residue) it is desirable to employ at least equimolar proportions of trityl halide and the compound (II). Where $y$ has the value 1 in the compound (II) it is desirable to employ at least 2 molar proportions, and where $y$ has the value 2, it is desirable to employ at least 3 molar proportions, of trityl halide per mole of the compound (II). In addition, where one or more of the groups R', R", and R'" in the compound having the Formula II represents a free amino or free thiol group, said group or groups will be tritylated under the above described conditions, and in this case it will be necessary to increase the proportions of trityl halide employed in the reaction by an amount of at least 1 molar proportion for each free amino or thiol group present in the starting compound having the formula II above.

The compounds having the Formula II above, which are employed as starting materials in the preparation of the compounds of the invention, can be obtained by the reaction of a halomercuri derivative of a purine having the formula:

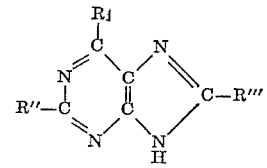

wherein R', R", and R'" are as hereinbefore defined with a polyacyl ester of a 2-halogenoketose, in the presence of an inert solvent, followed by deacylation of the resulting purine ketoside polyacylate. The above preparation is more particularly described in the application of W. Schroeder, Serial No. 788,761, filed January 26, 1959. Compounds having the Formula II which are suitable for use in preparing the novel compounds of the invention include 6-amino-9-D-psicofuranosylpurine,
6-hydroxy-9-D-psicofuranosylpurine,
6-mercapto-9-D-psicofuranosylpurine,
6-methylmercapto-9-D-psicofuranosylpurine,
9-D-psicofuranosylpurine,
6-dimethylamino-9-D-psicofuranosylpurine,
8-hydroxy-9-D-psicofuranosylpurine,
6,8-dihydroxy-9-D-psicofuranosylpurine,
2-methoxy-9-D-psicofuranosylpurine,
2-methyl-9-D-psicofuranosylpurine,
8-phenyl-9-D-psicofuranosylpurine,
6-amino-9-D-fructopyranosylpurine,
6-amino-9-D-xylulofuranosylpurine,
6-amino-9-D-ribulofuranosylpurine,
6-amino-9-D-sorbofuranosylpurine,
6-amino-9-D-sorbopyranosylpurine,
6-amino-9-D-tagatofuranosylpurine,
6-amino-9-L-psicofuranosylpurine,
6-amino-9-D-altroheptulopyranosylpurine,
6-amino-9-D-mannoheptulofuranosylpurine,
6-amino-9-D-glucoheptulopyranosylpurine,
6-amino-9-L-glucoheptulofuranosylpurine,
6-amino-9-D-sedoheptulofuranosylpurine and
6-amino-9-D-psicopyranosylpurine.

The compounds of the invention having the Formula I above, including those in which one or more of the groups $R_1$, $R_2$ and $R_3$ represent a free amino or free mercapto group, can also be prepared by reacting under the conditions described above a halomercuri derivative of a purine having the formula

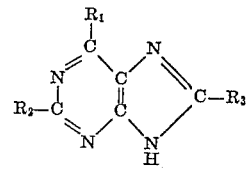

wherein $R_1$, $R_2$ and $R_3$ are as hereinbefore defined, with a 2-halogenoketose having the formula

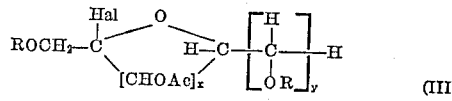

(III)

wherein $x$, $y$ and R are as hereinbefore defined, Hal represents a halogen atom and Ac represents an acyl radical corresponding to a hydrocarbon carboxylic acid or a substituted hydrocarbon carboxylic acid as hereinbefore defined. The acyl derivative of the compound having the Formula I so obtained is then deacylated as hereinbefore described to give the desired compound having the Formula I.

Where one or more of the groups $R_1$, $R_2$ and $R_3$, in the purine used as starting material, represents a free amino group or groups it is preferable to convert said amino group or groups to the corresponding acylamino group or groups, using the acylating agents and acylating conditions hereinbefore described, before subjecting said compound to the above condensation. The acylamino group or groups will be reconverted to a free amino group or groups during the deacylation step of the above-described procedure.

The 2-halogenoketoses having the Formula III above, which are employed as starting materials in the above-described procedure, can be obtained by tritylation of the appropriate ketose using the conditions hereinbefore described, followed by acylation of the trityl ether so obtained, and treatment of the resulting trityl ether acylate with anhydrous hydrogen halide, for example hydrogen chloride or hydrogen bromide, in a suitable solvent such as ether at a temperature of the order of 0° C.

The following example is illustrative of the process and products of the present invention, but is not to be construed as limiting.

EXAMPLE

*6-Tritylamino-9-D-Psicofuranosylpurine 1',6'-Ditrityl Ether*

A solution of 3.81 g. (0.0128 mole) of 6-amino-9-D-psicofuranosylpurine (previously dried at 60° C. at a pressure of 0.01 mm. of mercury for 12 hours) in 180 ml. of anhydrous pyridine was treated with 13.8 g. (0.0422 mole) of trityl bromide. The mixture was heated on a steam bath for 3 hours and then allowed to stand overnight at room temperature. The resulting solution was treated with 25 ml. of ice-water and the mixture was allowed to stand at room temperature for one hour before removing the solvents as completely as possible in a rotating evaporator at a temperature of 20° C. and a pressure of less than 1 mm. of mercury. The residue was dissolved in chloroform and the chloroform solution was washed three times with water before being dried over anhydrous sodium sulfate. The dried solution was filtered and the filtrate evaporated to dryness in a rotating evaporator at a temperature of 30° C. and a pressure of 15 mm. of mercury. The oily residue (16.9 g.) was dissolved by warming in 90 ml. of benzene and the solution was cooled. The crystalline material which separated was collected by filtration, washed with benzene and dried; this material weighed 0.896 g. and had a melting point of 242 to 244° C. after darkening at 238 to 240° C. The filtrate was evaporated to dryness in a rotating evaporator at a temperature of 30° C. and a pressure of 15 mm. of mercury. The oily residue (16.0 g.) was dissolved in benzene and subjected to chromatography on a column of 500 g. of magnesium silicate (Florisil), the desired product being eluted with 9 l. of a mixture of equal parts of ethyl acetate and benzene. The eluate was evaporated to dryness and the residue was recrystallized twice from benzene. There was thus obtained 6-tritylamino-9-D-psicofuranosylpurine 1',6'-ditrityl ether in the form of a crystalline solid having a melting point of 250 to 250.5° C. after darkening slightly at 248 to 250° C. The ultraviolet absorption spectrum of the compound in solution in 95% ethanol exhibited a maximum at 275 millimicrons ($a$=20.87; $a_M$=21,380) with shoulders at 268 millimicrons ($a$=20.07; $a_M$=20,550) and 284 millimicrons ($a$=14.76; $a_M$=15,110). The infrared absorption spectrum of the compound (mineral oil mull) exhibited maxima at 3340 (shoulder), 3280, 3120 (shoulder), 1792, 1604, 1583, 1520, 1495, 1140, 1125, 1110, 1086 (shoulder), 1072, 1030 (shoulder), 1025, 1000, 780, 770 (shoulder), 763, 740, 708, and 690 reciprocal centimeters.

*Analysis.*—Calcd. for $C_{68}H_{57}O_5N_5$: C, 79.76; H, 5.58; N, 6.84. Found: C, 79.57; H, 5.25; N, 6.81.

In a similar manner, but by increasing the amount of trityl bromide to 18.4 g. (0.0562 mole) where necessary and replacing 6-amino-9-D-psicofuranosylpurine by an equivalent molar amount of 6-hydroxy-9-D-psicofuranosylpurine,
6-mercapto-9-D-psicofuranosylpurine,
6-methylmercapto-9-D-psicofuranosylpurine,
9-D-psicofuranosylpurine,
6-methylamino-9-D-psicofuranosylpurine,
6-dimethylamino-9-D-psicofuranosylpurine,
8-hydroxy-9-D-psicofuranosylpurine,
6,8-dihydroxy-9-D-psicofuranosylpurine,
2-methoxy-9-D-psicofuranosylpurine,
2-methyl-9-D-psicofuranosylpurine,
8-phenyl-9-D-psicofuranosylpurine,
6-amino-9-D-fructopyranosylpurine,
6-amino-9-D-xylulofuranosylpurine,
6-amino-9-D-ribulofuranosylpurine,
6-amino-9-D-sorbofuranosylpurine,
6-amino-9-D-sorbopyranosylpurine,
6-amino-9-D-tagatofuranosylpurine,
6-amino-9-L-psicofuranosylpurine,
6-amino-9-D-altroheptulopyranosylpurine,
6-amino-9-D-mannoheptulofuranosylpurine,
6-amino-9-D-glucoheptulopyranosylpurine,
6-amino-9-L-glucoheptulofuranosylpurine,
6-amino-9-D-seduloheptulofuranosylpurine and
6-amino-9-D-psicopyranosylpurine there are obtained
6-hydroxy-9-D-psicofuranosylpurine 1',6'-ditrityl ether,
6-tritylmercapto-9-D-psicofuranosylpurine 1',6'-ditrityl ether,
6-methylmercapto-9-D-psicofuranosylpurine 1',6'-ditrityl ether,
9-D-psicofuranosylpurine 1',6'-ditrityl ether,
6-methylamino-9-D-psicofuranosylpurine 1',6'-ditrityl ether,
6-dimethylamino-9-D-psicofuranosylpurine 1',6'-ditrityl ether,
8-hydroxy-9-D-psicofuranosylpurine 1',6'-ditrityl ether,
6,8-dihydroxy-9-D-psicofuranosylpurine 1',6'-ditrityl ether,
2-methoxy-9-D-psicofuranosylpurine 1',6'-ditrityl ether,
2-methyl-9-D-psicofuranosylpurine 1',6'-ditrityl ether,
8-phenyl-9-D-psicofuranosylpurine 1',6'-ditrityl ether,
6-tritylamino-9-D-fructopyranosylpurine 1'-trityl ether,
6-trityl-amino-9-D-xylulofuranosylpurine 1'-trityl ether,
6-trityl-amino-9-D-ribulofuranosylpurine 1'-trityl ether,
6-trityl-amino-9-D-sorbofuranosylpurine 1',6'-ditrityl ether,
6-tritylamino-9-D-sorbopyranosylpurine 1'-trityl ether,
6-tritylamino-9-D-tagatofuranosylpurine 1',6'-ditrityl ether,
6-tritylamino-9-L-psicofuranosylpurine 1',6'-ditrityl ether,
6-tritylamino-9-D-altroheptulopyranosylpurine 1',7'-ditrityl ether,
6-tritylamino-9-D-mannoheptulofuranosylpurine 1',6',7'-tritrityl ether,
6-tritylamino-9-D-glucoheptulopyranosylpurine 1',7'-ditrityl ether,
6-tritylamino-9-L-glucoheptulofuranosylpurine 1',6',7'-tritrityl ether,
6-tritylamino-9-D-seduloheptulofuranosylpurine 1',6',7'-tritrityl ether, and
6-tritylamino-9-D-psicopyranosylpurine 1'-trityl ether, respectively.

It is to be understood that the invention is not to be limited to the exact details of operation or exact compounds shown and described, as obvious modifications and equivalents will be apparent to one skilled in the art and

I claim:

6 - tritylamino - 9-D-psicofuranosylpurine 1',6'-ditrityl ether.

References Cited in the file of this patent

Bredereck et al.: Ber. Deut. Chem. 73, pp. 269–273 (1940).